(12) United States Patent
Bubb et al.

(10) Patent No.: US 8,314,049 B2
(45) Date of Patent: Nov. 20, 2012

(54) HIGH POROSITY BETA-SPODUMENE-MULLITE COMPOSITE SUBSTRATE, ARTICLE, AND METHOD

(75) Inventors: Keith Norman Bubb, Watkins Glen, NY (US); Cameron Wayne Tanner, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 144 days.

(21) Appl. No.: 12/956,464

(22) Filed: Nov. 30, 2010

(65) Prior Publication Data

US 2011/0130278 A1  Jun. 2, 2011

Related U.S. Application Data

(60) Provisional application No. 61/265,106, filed on Nov. 30, 2009.

(51) Int. Cl.
   B01J 23/00   (2006.01)
   B01J 21/00   (2006.01)
   C04B 35/00   (2006.01)
   C04B 35/14   (2006.01)
   C04B 35/16   (2006.01)

(52) U.S. Cl. ........ 502/439; 502/243; 502/263; 502/407; 502/415; 501/133; 501/153; 501/154

(58) Field of Classification Search .......... 501/133, 501/153, 154; 502/243, 263, 407, 415, 439
See application file for complete search history.

(56) References Cited

U.S. PATENT DOCUMENTS

| | | | |
|---|---|---|---|
| 3,582,385 A | 6/1971 | Duke et al. | 106/390 V |
| 3,600,204 A | 8/1971 | Beall et al. | 106/39 DV |
| 3,834,981 A | 9/1974 | Grossman et al. | 161/192 |
| 3,839,001 A | 10/1974 | Adams et al. | 65/33 |
| 3,911,998 A | 10/1975 | Domicone et al. | 165/10 |
| 4,033,775 A * | 7/1977 | Grossman | 501/5 |
| 5,350,717 A | 9/1994 | Day et al. | 501/7 |
| 5,607,887 A * | 3/1997 | Pejryd et al. | 501/94 |
| 7,381,680 B2 * | 6/2008 | Nilsson et al. | 502/202 |
| 7,381,681 B2 * | 6/2008 | Nilsson et al. | 502/202 |
| 7,855,163 B2 * | 12/2010 | Liu et al. | 502/439 |
| 7,914,874 B2 * | 3/2011 | Henry et al. | 428/116 |
| 7,938,877 B2 * | 5/2011 | Liu et al. | 55/523 |
| 8,114,354 B2 * | 2/2012 | Li | 422/180 |

OTHER PUBLICATIONS http://www.corning.com/environmentaltechnologies/index.aspx, "Corning Environmental Technologies Products & Services", Click to View New Brochure, accessed Nov. 30, 2010 at 10:31 AM.

Karkhanavala, M. D. et al., "The Polymorphism of Cordierite", Journal of the American Ceramic Society, vol. 36, No. 12, Dec. 1, 1953, p. 389-392.

Prokopowicz, T. I. et al., "Reactions in the System Li2O-MgO-Al2O3-SiO2 : II, Phase Equilibria in the High-Silica Region", Journal of the American Ceramic Society, vol. 39, No. 8, Aug. 1956, p. 266-278.

* cited by examiner

Primary Examiner — Cam N. Nguyen
(74) Attorney, Agent, or Firm — John L. Haack

(57) ABSTRACT

A porous ceramic body including a major phase of beta-spodumene and a minor phase of mullite, the aggregate composition of a batch in weight percents of $LiAlSi_2O_6$, $SiO_2$, and $Al_6Si_2O_{13}$ are as defined herein. Also disclosed is a method for making a porous ceramic article is and includes: mixing inorganic batch ingredients including sources of silica, alumina, and lithia, with a liquid and an organic binder to form a plasticized batch mixture; forming a green body; and heating to the porous ceramic article, comprised of a major phase of beta-spodumene and a minor phase of mullite.

14 Claims, 8 Drawing Sheets

HIGH POROSITY BETA-SPODUMENE-MULLITE COMPOSITE SUBSTRATE, ARTICLE, AND METHOD

The entire disclosure of any publication or patent document mentioned herein is incorporated by reference.

CROSS-REFERENCE TO RELATED APPLICATION(S)

This application is related to commonly owned and assigned U.S. Ser. No. 61/265,106, filed Nov. 30, 2009, entitled "BETA-SPODUMENE-CORDIERITE COMPOSITION, ARTICLE, AND METHOD."

FIELD

The disclosure relates generally to a high porosity beta($\beta$)-spodumene-mullite composite substrate, an article, and methods thereof, such as for use in combustion exhaust emission control systems.

BACKGROUND

Various methods and devices are known for reducing emissions of engine exhaust, including catalyst supports, or substrates, and filters.

SUMMARY

The disclosure relates to a high porosity beta($\beta$)-spodumene-mullite composite substrate, an article such as a honeycomb body, and methods of making and use of the substrates and bodies.

BRIEF DESCRIPTION OF THE DRAWINGS

In embodiments of the disclosure.

DETAILED DESCRIPTION

Figure 1:
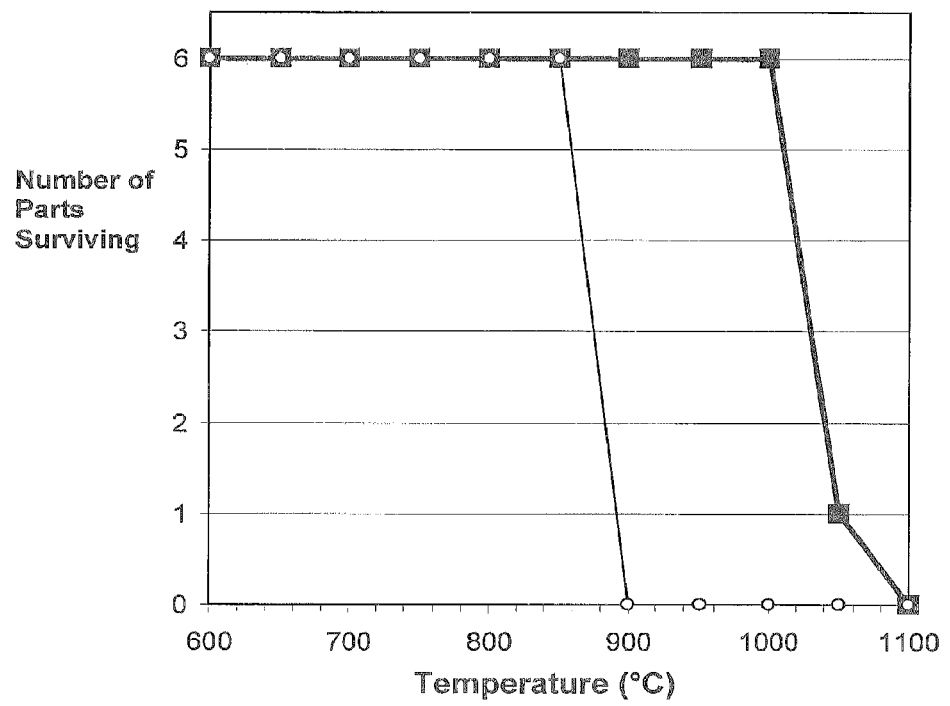
FIG. 1 shows plots of the number of parts of 2" diameter by 5" long 600/3 wares surviving oven shocks to progressively higher temperatures.

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

In embodiments, the disclosed compositions and articles thereof, and the method of making and use provide one or more advantageous features or aspects, including for example as discussed below. Features or aspects recited in any of the claims are generally applicable to all facets of the invention. Any recited single or multiple feature or aspect in any one claim can be combined or permuted with any other recited feature or aspect in any other claim or claims.

DEFINITIONS

"Porosity," and like terms generally refer to the void spaces or synonymously pores within the walls of the honeycomb material. The void space in a honeycomb occupied by the macroscopic channels is excluded. Porosity, and like aspects of the ceramic bodies, are mentioned in commonly owned and assigned U.S. Pat. No. 6,864,198. Parameters such as $d_{10}$, $d_{50}$ and $d_{90}$ relate to the pore size distribution. The quantity $d_{50}$ is the median pore size (MPS) based upon pore volume, and is measured in micrometers; thus, $d_{50}$ is the pore diameter at which 50% of the open porosity of the ceramic has been intruded by mercury (mercury porosimetry). The quantity $d_{90}$ is the pore diameter at which 90% of the pore volume is comprised of pores whose diameters are smaller than the value of $d_{90}$; thus, $d_{90}$ is equal to the pore diameter at which 10% by volume of the open porosity of the ceramic has been intruded by mercury. The quantity $d_{10}$ is the pore diameter at which 10% of the pore volume is comprised of pores whose diameters are smaller than the value of $d_{10}$; thus, $d_{10}$ is equal to the pore diameter at which 90% by volume of the open porosity of the ceramic has been intruded by mercury. The values of $d_{10}$ and $d_{90}$ are also in units of micrometers. The quantity $(d_{50}-d_{10}/d_{50})$ describes the width of the distribution of pore sizes finer than the median pore size, $d_{50}$.

"Super additive," "super addition," and like terms generally refer to adding additional ingredients or materials to a batch composition or like formulation in excess of, or in addition to, a 100 wt % base inorganics formulation. A base formulation totaling 100 wt % can be, for example, a combination of nano-zeolite in an amount from 20 to 70 weight percent and an inorganic filler material in an amount from 80 to 30 weight percent, and the super additives can be a mixture of pore formers, with or without other super additives, and can be present or added to the batch in, for example, from about 50 to about 300 wt % in addition to the base formulation 100 wt %.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, and like values, and ranges thereof, employed in describing the embodiments of the disclosure, refers to variation in the numerical quantity that can occur, for example: through typical measuring and handling procedures used for making compositions, concentrates, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture. The claims appended hereto include equivalents of these "about" quantities.

"Consisting essentially of" in embodiments refers, for example, to a catalytic honeycomb filter article having relatively high porosity and increased strength, to a method of making a catalytic filter article and precursors thereto, devices incorporating the catalytic filter article, and can include the components or steps listed in the claim, plus other components or steps that do not materially affect the basic and novel properties of the compositions, articles, apparatus, or methods of making and use of the disclosure, such as particular reactants, particular additives or ingredients, a particular agents, a particular surface modifier or condition, or like structure, material, or process variable selected. Items that may materially affect the basic properties of the components or steps of the disclosure or that may impart undesirable characteristics to the present disclosure include, for example, an article having significantly reduced porosity, and little or no improvement in strength of the article, that are beyond the values, including intermediate values and ranges, defined and specified herein.

The indefinite article "a" or "an" and its corresponding definite article "the" as used herein means at least one, or one or more, unless specified otherwise.

Abbreviations, which are well known to one of ordinary skill in the art, may be used (e.g., "h" or "hr" for hour or hours, "g" or "gm" for gram(s), "mL" for milliliters, and "rt" for room temperature, "nm" for nanometers, and like abbreviations).

Specific and preferred values disclosed for components, ingredients, additives, and like aspects, and ranges thereof, are for illustration only; they do not exclude other defined values or other values within defined ranges. The compositions, apparatus, and methods of the disclosure can include any value or any combination of the values, specific values, more specific values, and preferred values described herein.

In embodiments, the disclosure provides an article, and the article comprises, consists essentially of, or consists of one of:

a porous ceramic body having a major phase of beta-spodumene and a minor phase of mullite; or a fired porous ceramic body having a composition comprised of a mixture of $LiAlSi_2O_6$, $SiO_2$, and $Al_6Si_2O_{13}$; or a catalytic honeycomb filter body; or a combustion engine exhaust emissions control device having a honeycomb of the porous ceramic body having a honeycomb volumetric density of less than 0.3 $g/cm^3$.

In embodiments, the disclosure provides a method of making that comprises, consists essentially of, or consists of one of:

mixing inorganic batch ingredients comprising sources of silica, alumina, and lithia, with a liquid and an organic binder to form a plasticized batch mixture;

forming the plasticized batch mixture into a green body; and heating the green body to a top temperature of 1180 to 1300° C. for a time sufficient to convert the green body into the porous ceramic article, the article having a major phase of beta-spodumene and a minor phase of mullite.

For additional definitions, descriptions, and methods of siliceous formulations, silica materials and related metal oxide materials, see for example, R. K. Iler, *The Chemistry of Silica*, Wiley-Interscience, 1979.

Honeycomb substrates having high porosity (e.g., >55%), thinner walls (e.g., <3.5 mil), or both, are desired for applications like close-coupled converters having even faster light-off performance, low pressure drop gasoline particulate filters (GPF), and so-called NOx integrated filters having a porosity of >65% for maximum catalyst loading capacity. A significant challenge in delivering substrates for these applications is to maintain strength required for handling, canning, and use. Experience with products like Corning's Celcor® substrates with a cell density of 600 cells/in$^2$ and a wall thickness of 2.5-2.7 mil (600/2) and Corning's DuraTrap® AT aluminum titanate-based diesel particulate filters (DPF's) has shown the minimum acceptable strength to be about 200 psi as measured by the axial modulus of rupture.

The situation for the close-coupled converter is an especially difficult one. More than 75% of emissions from spark-ignited gasoline-fueled engines arise during cold-start when the catalysts in the after treatment system are too cold to process pollutants. Reducing the time to light-off is a direct way to lower these emissions. The time to light-off is proportionate to the density of the coated substrate; a lighter converter heats more quickly. The current state-of-the-art substrate for light-off performance is 600/2; porosity of the material is about 25%. To achieve quick light-off, the mass of this substrate has been reduced to the greatest extent possible while still maintaining strength sufficient to support externally applied forces. The strength may be aided by features such as webs that are thicker near the skin, as described in, for example, U.S. Pat. No. 6,803,087.

A performance target for a next generation converter substrate is, for example, to accelerate light-off by about 20 to 25%. For typical washcoat loadings of about 0.12 to about 0.20 $g/cm^3$, this translates to a reduction in substrate density of about 40%. Two ways to achieve the light-off target are to raise the porosity while keeping the wall thickness fixed or to reduce the wall thickness. Such an increase in porosity or decrease in wall thickness has been confirmed in laboratory tests on cordierite to lower the strength far below the 200 psi threshold. The strength of commercially produced with nominal cell density of 600 in$^{-2}$ and a wall thickness of 4 mil has been measured to be only 180 psi when its porosity is increased from about 35% to about 57%. Adjusting to a cell density and wall thickness of 600/2 by normalizing with ratios of closed-frontal areas gives an estimated strength of only 143 psi.

A similar situation exists for GPF's that are being explored for use in vehicles powered by gasoline direct inject (GDI) engines. Maintaining a low pressure drop is desired, as the advantages of higher fuel efficiency and increased power from a GDI engine can be lost if engine backpressure from the after treatment system is too high. Like a DPF, a GPF is a wall flow filtration device so pressure drop depends not only on cell density and wall thickness but also substrate porosity and pore size distribution of the honeycomb wall. A GPF may also be catalyzed and expected to deliver fast light-off. Both needs push to low honeycomb mass where maintaining strength becomes more challenging.

There are two approaches being considered to improve strength of low mass honeycombs. Optimization of microstructure of traditional microcracked cordierite increases the specific strength from 850 to about 1100 psi·cm$^3$/g. Exceptional predicted thermal shock resistance is also obtained. However, the gain is not sufficient to comfortably meet the strength criteria at porosities of more than 55% for thin wall applications, i.e., ware density <0.16 $g/cm^3$. The second approach is a low or non-microcracked cordierite (NMC). It relies upon high strain tolerance to offset the increase in thermal expansion coefficient to retain thermal shock resistance. As microcracks are the strength limiting flaw, their elimination leads to specific strengths beyond 2,000 psi·cm³/g. However, thermal shock performance obtained on as-fired and bare NMC substrates is less than predicted. For example, compare the predicted thermal shock limits provided in Table 2 and measured oven thermal shock failure temperatures plotted in FIG. 1 of the NMC(CONTROL (C2); open circles) to the commercially produced cordierite (CONTROL (C1); black squares). Despite the predicted superior thermal shock performance, the oven thermal shock temperature of NMC is less than commercially available cordierite.

A low, cost, thermal shock resistant material with a specific strength of at least 1400 psi·cm³/g to enable substrates with ware densities at or below 0.160 g/cm³ is disclosed. The disclosure also provides spodumene-mullite composites with high strength and thermal shock resistance. The disclosed wash coated spodumene-mullite composites were evaluated for emissions performance and physical properties.

Figure 8:
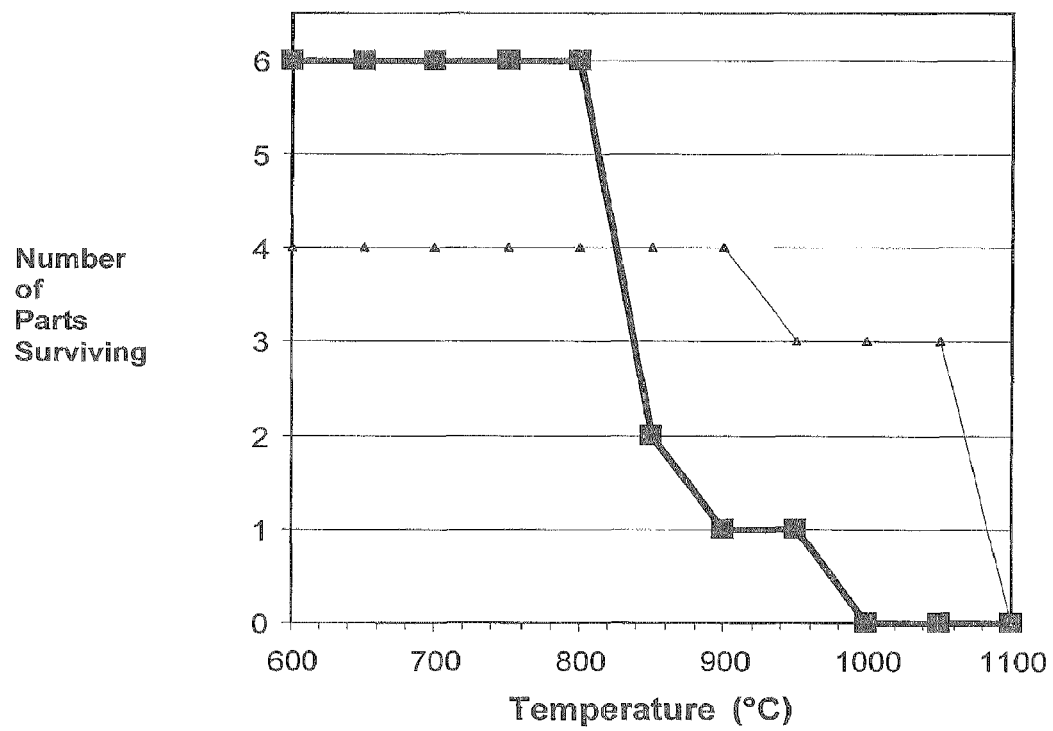
FIG. 8 shows oven thermal shock resistance with 100 g/L of the disclosed model three-way washcoat Control (C1) (squares), and (H)(triangles).

In addition to mechanical attributes, the utility of the disclosed compositions for catalytic applications can be dependent upon compatibility with washcoats. Spodumene materials contain lithium, which is a known poison to catalysts. The disclosed spodumene-mullite composites were wash coated for laboratory evaluation of catalytic performance and assessment of changes in physical properties. Steady-state and light-off performance such as those in Table 4 show that the spodumene-mullite composites do not poison three-way washcoats during the coating process or after simulated aging of use conditions. The physical properties such as strength as listed in Table 5 and thermal shock resistance as plotted in FIGS. 1 and 8 were retained after washcoating and aging. In summary, the disclosed spodumene-mullite composites have thermal, mechanical, and chemical properties that are an excellent fit for after treatment substrate applications.

The disclosure provides low or non-microcracked spodumene-mullite composite substrates containing spodumene as the major phase. The compositions are low-microcracked to non-microcracked, and can be prepared by a ceramic processing route having one or more of the following conditions:

1) the microcrack index ($Nb^3$) is less than about 0.15 and preferably less than about 0.1;

2) the inorganic composition as described by the weight percentages of the pure ternary end members identified by the respective subscripts are as follows:

$$w_{spodumene}=100x(0.2z+0.75),$$

$$w_{silica}=100(1-x)(0.2z+0.75), \text{ and}$$

$$w_{mullite}=100(0.25-0.2z)$$

subject to the constraints that $0.55<x<0.75$ and $0<z<1$. The "x" and "z" are unitless adjustable parameters that map out a space in the ternary phase diagram that encompasses the disclosed compositions;

3) the porosity, as measured by mercury porosimetry, is greater than about 40%; and 4) the mean pore size, also measured by mercury porosimetry, is from about 0.5 to about 10 micrometers. The disclosure also provides use of the material as a support for a catalyst or sorbent, or use as a filter.

In embodiments, the disclosure provides a porous ceramic body comprised of a major phase of beta-spodumene and a minor phase of mullite, wherein the aggregate composition of a batch in weight percents of $LiAlSi_2O_6$, $SiO_2$, and $Al_6Si_2O_{13}$ are given by the above formulas for $w_{spodumene}$, $w_{silica}$, and $w_{mullite}$, and the x and z unitless parameters In embodiments, the disclosure provides a combustion engine exhaust emissions control device comprising a honeycomb of the porous ceramic body described above having a honeycomb volumetric density of less than 0.3 g/cm³. The device can be, for example, selected from close-coupled engine exhaust converters, gasoline engine particulate exhaust filters, and NOx integrated engine exhaust filters.

The beta-spodumene and mullite phases together can be, for example, more than 90% by weight of the body, and the body contains less than 5% by weight of an amorphous (glass) phase.

The body can be, for example, greater than 50% beta-spodumene and less than 40% mullite by weight, such as, greater than 75% beta-spodumene and less than 25% mullite by weight including intermediate values and ranges. In embodiments, the body can further include less than 15% corundum by weight.

In embodiments, the body can have, for example, a total porosity of greater than 35% as measured by mercury intrusion porosimetry. The body can have, for example, a total porosity of 35 to 70%.

In embodiments, the body can have, for example, a median pore size of less than about 20 micrometers, such as a median pore size of from about 2 to about 20 micrometers, from about 3 to about 19 micrometers, from about 4 to about 18 micrometers, including intermediate values and ranges. Bodies having a median pore size less than about 2 micrometers can result in poor adherence of a washcoat.

In embodiments, the body can have, for example, a pore size distribution $(d_{90}-d_{10})/d_{50}$ less than 0.4

In embodiments, the disclosure provides a method for making a porous ceramic article comprising:

mixing inorganic batch ingredients comprising sources of silica, alumina, and lithia, with a liquid and an organic binder to form a plasticized batch mixture;

forming the plasticized batch mixture into a green body; and heating the green body to a top temperature of 1180 to 1300° C. for a time sufficient to convert the green body into the porous ceramic article, the article being comprised of a major phase of beta-spodumene and a minor phase of mullite.

The beta-spodumene and mullite phases together can be, for example, more than 80 wt % of the porous ceramic article.

The lithia source can be, for example, one or more lithium-containing compounds such as selected from spodumene, petalite, and like sources, or combinations thereof.

In embodiments, the porous ceramic article can contain, for example, less than about 4 wt % glass, such as from about 0.1 to about 4 wt % glass, including intermediate values and ranges.

In embodiments, the plasticized batch mixture can further comprise, for example, a pore forming agent including mixtures of two or more pore formers.

In embodiments, the inorganic batch ingredients can comprise, for example, α-spodumene in an amount of at least 40 wt % with respect to the inorganic batch ingredients.

In embodiments, the disclosure provides a porous spodumene-mullite honeycomb body having a honeycomb volumetric density of less than 0.3 g/cm³. The honeycomb body can have, an axial modulus of rupture strength of, for example, at least 200 psi. The honeycomb body can have, for example, a microcrack index ($Nb^3$) below 0.2, such as from about 0.01 to about 0.2, including intermediate values and ranges.

The disclosed articles methods of making and using are advantaged by at least one or more of the following:

The disclosed compositions and articles provide low or non-microcracked spodumene-mullite composite substrates.

The disclosed compositions can have a specific strength above, for example, 2,000 psi·cm$^3$/g that can be routinely achieved in the low or non-microcracked state to meet, a 200 psi axial MOR criteria at ware densities below, for example, 0.16 g/cm$^3$, thus enabling high porosity and thin wall substrates. In embodiments the disclosed compositions can be, for example, a honeycomb body having an axial modulus of rupture strength of from about 175 to about 1200 psi, including intermediate values and ranges, such 200 psi or higher.

The thermal expansion coefficient is frequently <1.2 ppm/K between room temperature and 800° C. and strain tolerance is above 0.1% providing excellent thermal shock resistance.

Properties including strength are retained (ΔMOR<15%) through washcoating and thermal treatments that simulate use.

The heat capacity of spodumene is low (like that of cordierite) and can be selected for fast light-off.

Naturally occurring batch materials like alpha(α)-spodumene ore and petalite are available at low cost as sources of lithium (e.g., <$0.38/lb), other batch materials are the same or similar to those used presently in manufacturing of cordierite.

The batch materials are compatible with extrusion forming processes and rheological systems.

Catalytic performance of the composite is not poisoned by lithium from the spodumene.

These and other aspects of the disclosure are illustrated and demonstrated herein.

Like cordierite, spodumene is subject to microcracking due to thermal expansion anisotropy. Microcracks are a strength controlling property, and spodumene is not necessarily any stronger than cordierite. The specific strength of cellular spodumene material is about 800 to about 1100 psi·cm$^3$/g and is comparable to microcracked cordierites such as CONTROL (C1), Corning's Celcor® 600/2 substrate, and Corning's. DuraTrap® AC diesel particulate filter product (U.S. Pat. No. 5,962,351, mentions β-spodumene formed principally from mineralogical sources and 5 to 25% glass that have expansions below 1 ppm/K and strength above 4 kpsi).

The disclosure provides spodumene-mullite composites within the spodumene-silica-mullite ternary. The disclosed spodumene-mullite composites overcome the above mentioned issues to provide a predominantly spodumene phase material for use as a catalytic converter or gasoline particulate filter substrate having superior attributes like pressure drop, strength, and time to light-off In embodiments, the composite can be prepared, for example, by reactive sintering starting with a low cost, naturally occurring material like α-spodumene, transformed α-spodumene, or petalite ore rather than a glass-ceramic frit. Dissolution of alumina and silica components into the spodumene phase reduces the total amount of lithium oxide that can ion exchange and lead to changes in physical properties or poisoning of supported catalysts. The dissolved species and cordierite also frustrate diffusion of lithium to slow the exchange process. Addition of a second phase like mullite to the spodumene limits growth of grains or domains during the process of sintering. Smaller domains either prevent or limit the size of microcracks to give higher strength. Addition of mullite enhances the refractory character of the ware.

In embodiments, the disclosure provides porous spodumene-mullite composites having one or more the following properties:

a concentration of mullite of more than 5 weight % and less than 25 weight %, more preferably having from about 10 to about 20 weight % mullite, with the remaining phases being predominantly spodumene with lesser phases of mullite, quartz, spinel, or corundum.

a thermal expansion coefficient (CTE) between room temperature and 800° C. of less than about 2.0 ppm/K, and preferably less than about 1.4 ppm/K;

a microcrack index (Nb$^3$) of less than about 0.2, and preferably less than about 0.15 for a specific strength (strength to weight ratio) of 1,400 psi·cm$^3$/g, and preferably greater than about 1,600 psi·cm$^3$/g;

a domain size of less than about 14 micrometers;

a ware density of less than about 0.2 g/cm$^3$ through any combination of wall thickness, cell density, and porosity;

a strain tolerance of greater than about 0.1% with strain tolerance of about 0.12% or higher being preferred;

a thermal shock parameter (TSP) defined by axial modulus of rupture (MOR) divided by the elastic modulus (Emod) and again divided by the thermal expansion coefficient (CTE) between room temperature and 800° C. of greater than about 600° C., preferably 800° C., and more preferably 1000° C.

a mean pore size of about 0.5 to about 10 micrometers;

use of pyrolytic pore formers like graphite and rice starch to control the amount of porosity and mean pore size, and combinations thereof.

EXAMPLES

The following examples serve to more fully describe the manner of using the above-described disclosure, as well as to set forth the best modes contemplated for carrying out various aspects of the disclosure. It is understood that these examples do not limit the scope of this disclosure, but rather are presented for illustrative purposes. The working examples further describe how to prepare the porous articles of the disclosure.

Preparation of a Green Body a Green Body can be Prepared According to U.S. Pat. Nos. 5,332,703, entitled "Batch Compositions for Cordierite Ceramics," and 6,221,308, entitled "Method of Making Fired Bodies," both assigned to Corning, Inc., and as modified according to the present disclosure.

Example 1

Physical properties The disclosed spodumene-mullite compositions were prepared using α-spodumene ore. The ore was processed by grinding, sieving, and air-classification to provide particle size distributions compatible with the process for extrusion of cellular ceramics. The compositions of the exemplary batches and reference batches (i.e., cordierite (CONTROL (C1))), and a non-microcracked cordierite (CONTROL (C2)) are listed in Table 1. Note that rice, starch, and graphite are present in several of the batches as pyrolytic pore formers to increase porosity. The physical properties after sintering of each composition are listed in Table 2 including reference batches (i.e., cordierite (CONTROL (C1))), and a non-microcracked cordierite (CONTROL (C2)).

Figure 2:
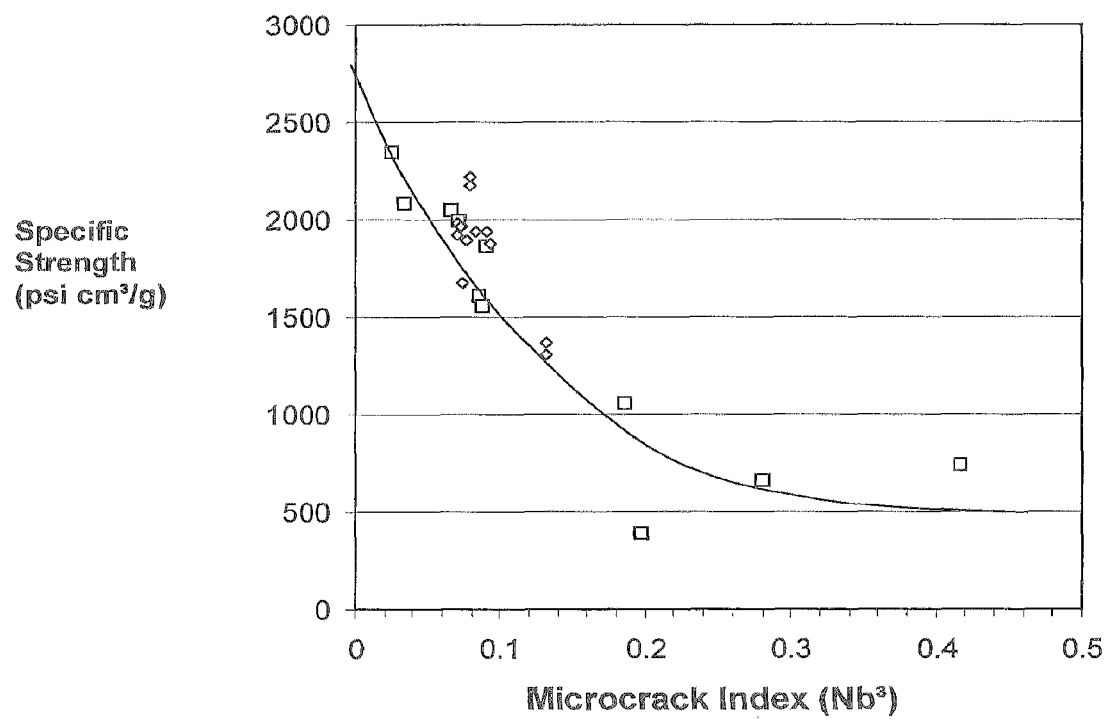
FIG. 2 shows plots of specific strength as a function of microcrack index for several spodumene-cordierite (squares) and spodumene-mullite (diamonds) compositions.

Significantly, α-spodumene ore that has been milled and air-classified to a mean particle size of about 4 micrometers can be selected as a starting material. This enables formation of a low microcracked ceramic having high porosity and a high specific strength. The dramatic influence of the state of microcracking as measured by the microcrack index on specific strength of spodumene-mullite and spodumene-cordierite compositions is illustrated in FIG. 2. Specific strength decreases from roughly 2,500 psi·cm$^3$/g for the non-microcracked material to less than about 1,000 psi·cm$^3$/g once the microcrack index exceeds about 0.2. A microcrack index of less than about 0.15 is desirable to obtain a cellular strength of 200 psi or more at a ware density of about 0.12 g/cm$^3$.

The method for evaluation of the microcrack index (Nb$^3$) is based upon its relationship to elastic modulus as compared to modulus of the material if it were not microcracked. The relationship was first described in an analysis by Walsh ("The Effect of Cracks on the Compressibility of Rock," *J. Geophysical Res.*, Vol 70, No 2, 1965). It is further developed for application to cordierite by G. Merkel ("Stabilized Low-Microcracked Ceramic Honeycombs and Methods Thereof," WO2009108357 A1, filed Feb. 27, 2009), Beall, et al., ("Low Microcracked, Porous Ceramic Honeycombs and Methods of Manufacturing the Same," U.S. Pat. No. 7,618,699), and Armistead, et al, (U.S. Pat. No. 3,842,017 mentions catalyzation of honeycomb substrates made from variety of materials including spodumene).

According to the disclosed method, elastic modulus is measured as a function of temperature on both heating and cooling. By analysis of the elastic modulus on cooling, one can extrapolate to the modulus of the material at room temperature if it were not microcracked. The same method has been applied to the spodumene examples here but with one difference. The room temperature elastic modulus of spodumene, if it were not microcracked, is determined by extrapolation using the rate of change of modulus with temperature for cordierite. This was necessary as the temperature dependency of the modulus of non-microcracked spodumene was not available in the literature. Further, it was not possible to prepare a non-microcracked spodumene to perform the measurement. This assumption is thought to be reasonable as both cordierite and spodumene are principally aluminosilicates with bonds of similar strengths so the rate of change of modulus of temperature should be similar.

Figure 3:
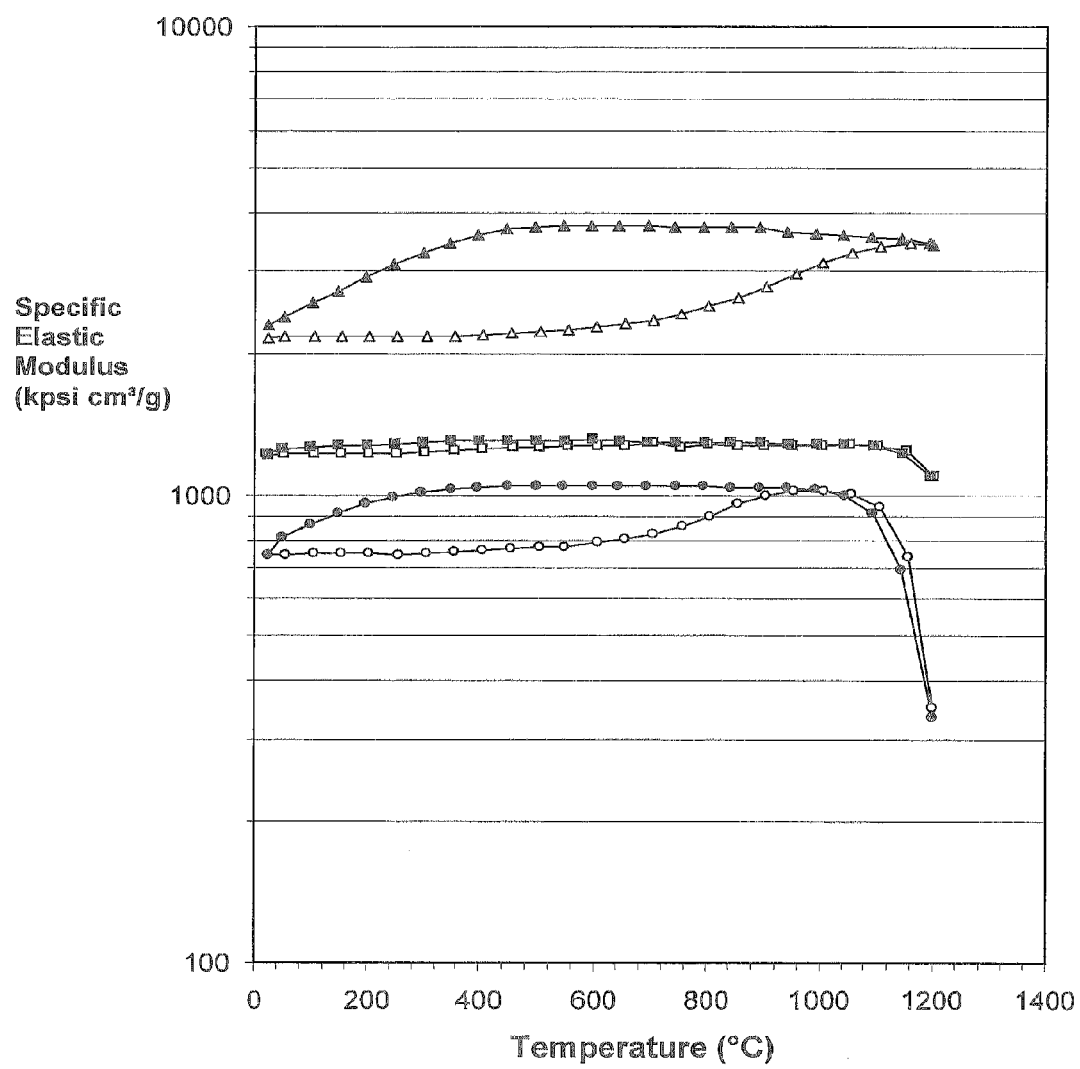
FIG. 3 shows the elastic modulus on heating and cooling of the disclosed spodumene-mullite samples: (D) fired at 1285° C., (A) fired at 1225° C., and CONTROL (C1).

Example traces of elastic modulus are plotted as a function of temperature in FIG. 3. The elastic modulus data are shown on a logarithmic scale to make direct visual comparison of the magnitude of the hysteresis of samples with differing porosities and cellular designs possible. A larger swept area between the heating and cooling curves measured or judged from the log-scale reflects a higher level of microcracking. As a baseline reference, the elastic modulus of CONTROL (C1) (triangles; open=heating, black=cooling), is plotted to illustrate the hysteresis associated with a microcrack index of 0.465. In comparison, a spodumene-cordierite composite (A) (circles; open=heating, black=cooling), has a somewhat smaller swept area and a slightly lower Nb$^3$ of 0.417. The spodumene-mullite of the disclosure, composite (D) (squares; open=heating, black=cooling), fired at 1285°, has a much smaller swept area and a microcrack index of just 0.077.

Figure 4A:
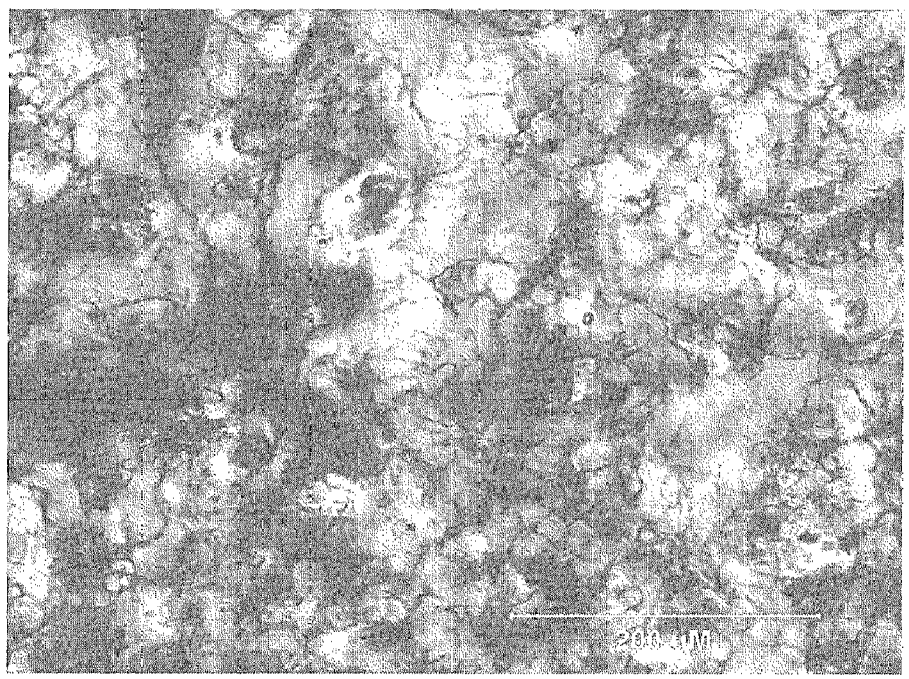
FIGS. 4A and 4B show optical micrographs of thin sections in transmission with polarized light to reveal domain regions in a spodumene-cordierite (A) fired at 1235° C. with an average domain size of 26 micrometers (FIG. 4A), and a spodumene-mullite (D) sintered at 1285° C. with an average domain size of <14 micrometers ($\mu$m) (FIG. 4B).
Figure 4B:
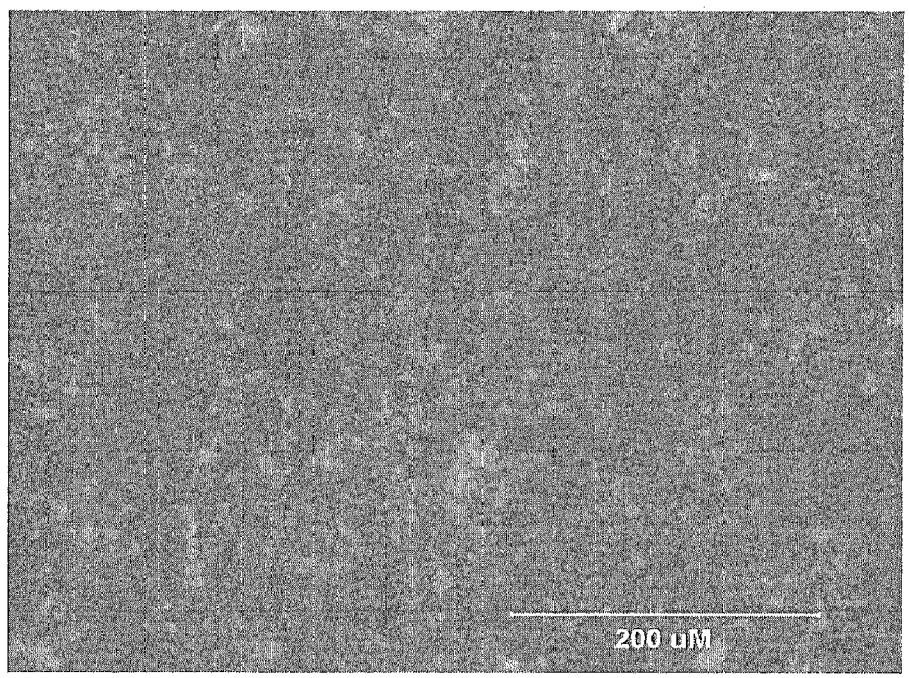

Control of the extent of microcracking is another feature of the disclosure. The tendency of a material to microcrack depends upon its domain size. Upon cooling from firing, elastic strain energy accumulates in polycrystalline materials that are comprised of grains that are themselves anisotropic. Release of the elastic strain energy in the form of cracks is inhibited by the energy of formation of new surfaces if the domains are small. Once the domains are large enough, the surface energy is no longer able to prevent release of the elastic strain energy and cracks develop. A critical domain size based upon the balance of these two energy terms determines the extent of microcracking. In the disclosed spodumene-mullite materials, domain size can be controlled by, for example, the size of the α-spodumene ore particles and their spacing within the batch. The influence of the size of the ore particles on domain size is shown in FIG. 4. The micrographs in FIG. 4 were obtained by examination of thin sections using polarized light in transmission. The polarized light interacts with the birefringence of the spodumene crystals. When viewed through an analyzer, the domains of opposing orientations are revealed in blue and yellow. The examples in the figure are for the composition (A) that was prepared from the as-received ore after sieving through a 325 mesh screen to remove particles larger than about 44 micrometers, the size of the openings in the sieve. The mean particle size is estimated to be about 20 to about 30 micrometers. The ore in the second composition was ground in a vibratory mill and air classified to a mean particle size of about 4 micrometers. The domain size of composition (A) is roughly 26 micrometers whereas that of composition (D) sample was significantly smaller, <10 micrometers, and below the sensitivity threshold of this measurement technique.

Figure 5:
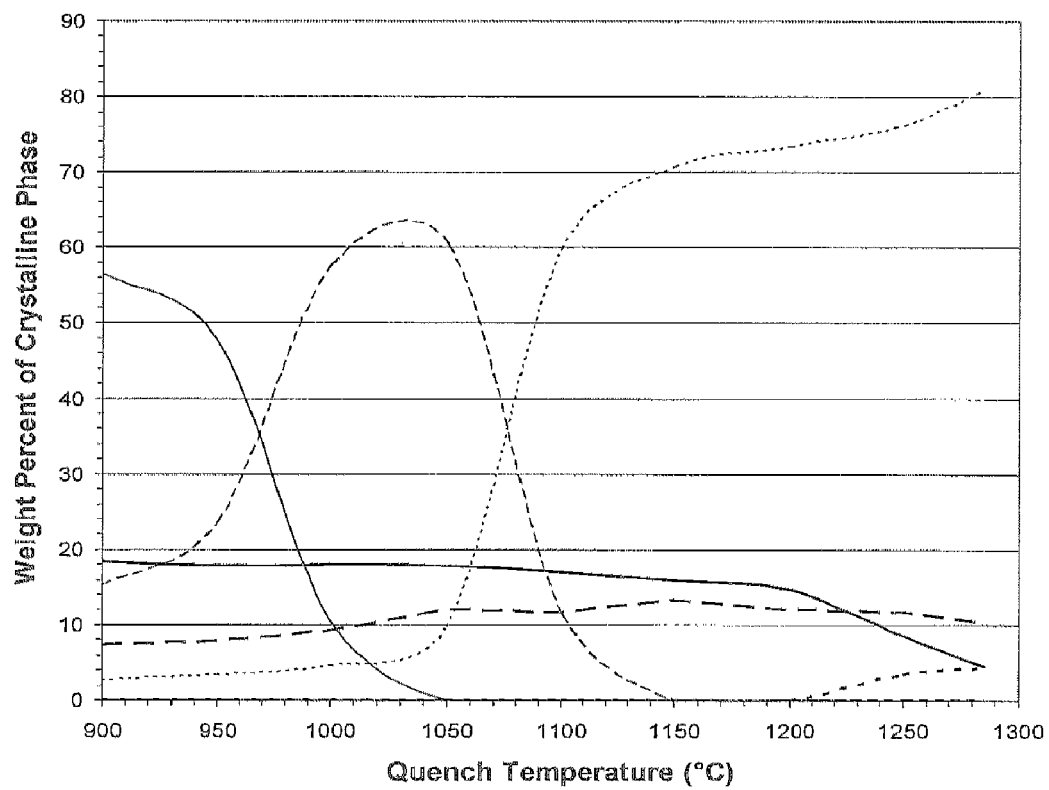
FIG. 5 shows a phase assemblage of spodumene-mullite batch (E) after 4 hour holds at the indicated temperatures illustrating the sequence of reactions that generate $\beta$-spodumene from $\alpha$-spodumene ore.

The link between domain size of the β-spodumene in the fired ceramic and size of the α-spodumene ore particle is a consequence of the reaction sequence. The α-spodumene ore is a metastable phase that on heating transforms into the β-phase without the need for mass transfer associated with a chemical reaction such as between lithium carbonate, alumina, and silica. The α-ore contains all necessary components to generate the β-structure. The transformation of each α-spodumene particle may initiate separately once sufficient thermal energy is provided. The sequence of reactions to generate a spodumene-mullite including the transformation α- to β-spodumene phase via the stuffed quartz is illustrated in FIG. 5. Therefore, the disclosure includes use of α-spodumene ore with a mean particle size from about 0.5 to about 10 micrometers. In FIG. 5: quartz (solid black line); Cristobalite (bold dashed line); Mullite (bold long dashed line); alpha-spodumene (thin solid line); Virgilite (long dashed line); and beta-spodumene (short dashed line). At about 970° C. alpha-spodumene converts to beta-quartz (stuffed). At about 1080° C. beta-quartz(stuffed) converts to beta-spodumene. At about 1225° C. quartz transforms to Cristobalite and silica dissolves into beta-spodumene.

Example 2

Resistance to catalyst poisoning Poisoning of catalyst surfaces by alkali components of sintered ceramics is a known issue for beta-spodumene. There are at least two possible opportunities for poisoning of a three-way-washcoat catalyst. One is that the pH of washcoat slurry is typically below about four. The protons from the washcoat slurry may ion exchange with the lithium from the spodumene. Some of the lithium ions then deposit on catalyst sites and poison catalyst activity. Another possible poisoning opportunity is that the lithium diffuses at high temperature out from the spodumene and onto the catalyst. The process can be accelerated by the presence of steam. The potential for poisoning by both mechanisms was screened by comparing conversion of propene, carbon monoxide, and nitrous oxide of a spodumene-mullite composite substrate to a cordierite honeycomb fresh and after aging at 950° C. for 24 hours in 10% steam. The hydrothermal aging treatment is commonly used in laboratory settings to simulate aging of three-way catalysts. Hydrothermal aging is not a formal aging procedure like the RAT-A protocol (see e.g., Sims, G. S., et al., (1988) SAE Technical Paper 881589). However, hydrothermal aging spans a similar range of temperature and time. For this reason, the laboratory aging treatment simulates some significant number of miles of use, but it is not possible to translate the hours of treatment to miles of driving as with RAT-A treatment. Hydrothermal aging of three-way catalysts and the relationship to engine aging has been generally described, see U. Lassi, Dissertation entitled "DEACTIVATION CORRELATIONS OF PD/RH THREE-WAY CATALYSTS DESIGNED FOR EURO IV EMISSION LIMITS," University of Oulu Press, Finland, 2003 (ISBN 951-42-6954-3 (PDF)).

The spodumene-mullite composite used for the tests was batch composition (C) with a nominal cell density of 600 cpsi and wall thickness of about 3 mil. The composition was designed to produce roughly equivalent 20% mullite and 80% β-spodumene after firing. The reference cordierite substrate was batch composition CONTROL (C1) and also had a nominal cell density of 600 cpsi and a wall thickness of about 4 mil. Batch details and substrate properties are provided in Tables 1 and 2, respectively.

The wash-coated substrates were about 50 mm in diameter and 150 mm in length although any suitable size can be used. The three-way washcoat composition formulation is listed in Table 3 appended below. The precious metals concentration was about 200 g/ft$^3$. A relatively low washcoat loading of 0.1 g/cm$^3$ was selected to enhance any effect of poisoning. A semi-automated vacuum coating unit was used to pull the washcoat slurry into the ware. The total amount of slurry to satisfy the desired pick-up of 0.1 g/cm$^3$ was calculated based on substrate volume. The amount was then divided by two. This allows one-half (½) of the coating to be pulled in each end of the substrate to create a more uniform coating layer. The vacuum pull pressure and time were 6 kPa for 40 seconds. The wash-coated substrates were dried at 70° C. for about 16 hrs (overnight) and then calcined at 550° C. for 3 hrs. Following coating, two 1 inch long segments were cut from each type of ware for catalytic testing. One sample was tested fresh and the other was aged at 950° C. for 24 hrs in 10% steam before being tested.

A model gas for conversion tests consisted of: 14% CO$_2$, 10% H$_2$O, 0.49% O$_2$, 0.5% CO, 0.17% H$_2$, 0.12% C$_3$H$_6$, and 0.05% NO with the balance being N$_2$. Evaluations for catalytic performance to screen for poisoning were performed under two modes: near steady-state; and light-off. The two different modes were obtained by control of the heating ramp rate of the model gas at the inlet to the samples. The ramp for near steady state was 30° C./min and for light-off about 1000° C./min. The range of temperatures for the tests was 110 to 450° C. The space-velocity was fixed at 60 k/hr in all cases. Four conversion traces were taken for each temperature and flow condition. The first test at each condition and mode was considered a conditioning treatment and rejected from any analyses. The same sample was tested fresh and then again after aging. Finally, all processing and testing of the spodumene-based substrate was handled separately and after the reference to avoid any potential for cross-contamination of the reference. A summary of the results of times for 50% conversion of CO, NO, and C$_3$H$_6$ is listed in Table 4. The times for 50% conversion for steady-state and light-off modes are similar for both material types whether fresh or aged. There was no evidence of any poisoning of the catalyst by the spodumene during the washcoating process or over the course of use at elevated temperatures. The presence of mullite and the reduction in the overall lithium concentration of the disclosed compositions imparts resistance to catalyst poisoning.

Example 3

Physical property advantages of the spodumene-mullite composites The washcoat composition can be significant in assessing whether a catalyst support substrate can achieve targets for catalytic converter or filter applications. As mentioned above, the axial modulus of rupture preferably can be greater than 200 psi for handling and canning. The substrate must also survive thermal shock downshock associated with calcination of the washcoat, and multiple thermal shocks delivered over a lifetime of service. The criterion for survival is no cracking after three shocks at each temperature.

The influence of the washcoating process and simulated aging on properties of CONTROL (C2) and a low microcracked cordierite composition (CONTROL (C2)) are compared to that of spodumene-mullite composites (B) and (C) in Table 5. Table 5 lists properties of CONTROL (C2), and two spodumene-mullite composites in the bare and "as-fired", freshly coated with 0.1 g/cm$^3$ of catalyst and catalyst support, and coated and aged at 950° C. for 24 hours in 10% steam, respectively. The table includes the thermal shock parameters (TSP) to rank survivability in up (heating) and down (cooling) thermal shock conditions. The thermal shock parameters for up (heating) and down (cooling) thermal shock situations are defined as follows:

$$TSP_{Heat} = \frac{\varepsilon_f}{\alpha_{25 \to 800° C.}} \text{ and } TSP_{Cool} = 200 + \frac{\varepsilon_f}{\alpha_{1000 \to 200° C.}}$$

$$\text{where } \varepsilon_f = \frac{\sigma_f}{E}$$

where $\sigma_f$ is the modulus of rupture, E is the elastic (Young's) modulus, $\varepsilon_f$ is the strain tolerance, and $\alpha$ is the average thermal expansion coefficient taken on the thermal path indicated by the subscript.

The disclosed beta-spodumene and mullite compositions are superior to the reference cordierite materials in at least two ways. First, the disclosed beta-spodumene-mullite compositions provide dramatically higher strain tolerance than heavily microcracked materials like the CONTROL (C1) reference. The strain tolerance of the disclosed beta-spodumene-mullite compositions is roughly at least a factor of two greater than CONTROL (C1) regardless of its condition. The increased strain tolerance enhances thermal shock resistance; this is especially evident for (B). Second, low or non-microcracked cordierites that are predicted to offer high thermal shock resistance in the bare state like CONTROL (C2) contain additives to the batch to generate a glass phase, in this case lanthanum oxide and bentonite. The glass and hence physical properties of these materials undergo significant changes on thermal aging especially in the presence of a washcoat. In particular, large drops in strength are observed. For the low microcracked CONTROL (C2) material, the strength drops by roughly 50% after aging with the washcoat. In comparison, the strength of the spodumene-mullite composites is retained though washcoating and aging. It is also noted that the drop in strength of the low microcracked cordierite CONTROL (C2) is detrimental to the predicted thermal shock performance of the material. Based upon these results, it can be seen that the disclosed beta-spodumene-mullite materials are especially well-suited for use in ultra low mass substrate applications such as a close-coupled three-way catalytic converter.

Example 4

Figure 6:
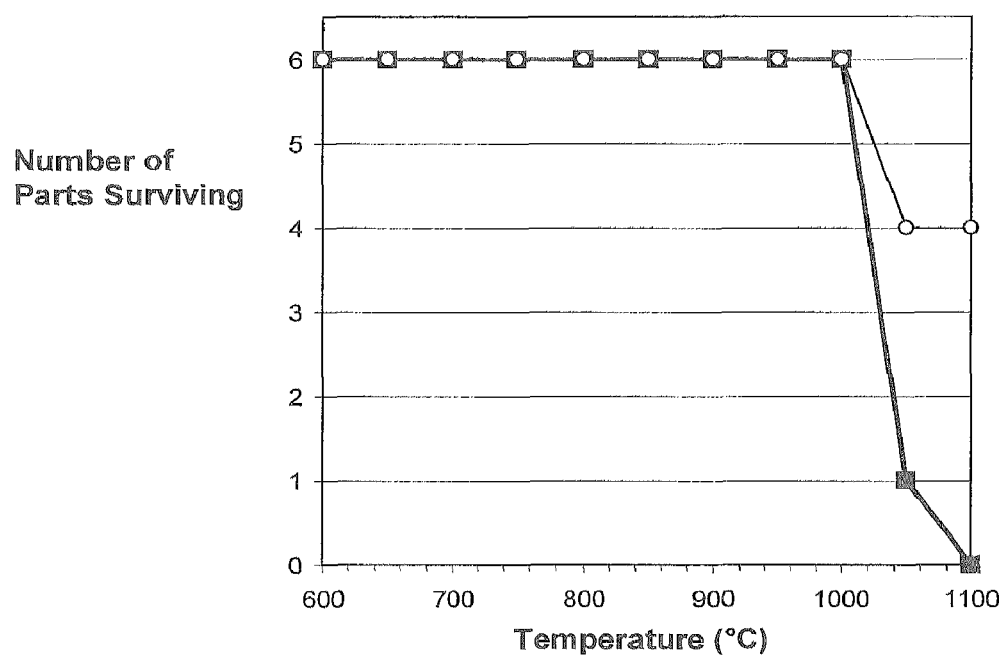
FIG. 6 shows a plot of the number of parts of 2" diameter by 5" long 600/3 wares surviving oven shocks to progressively higher temperatures.
Figure 7:
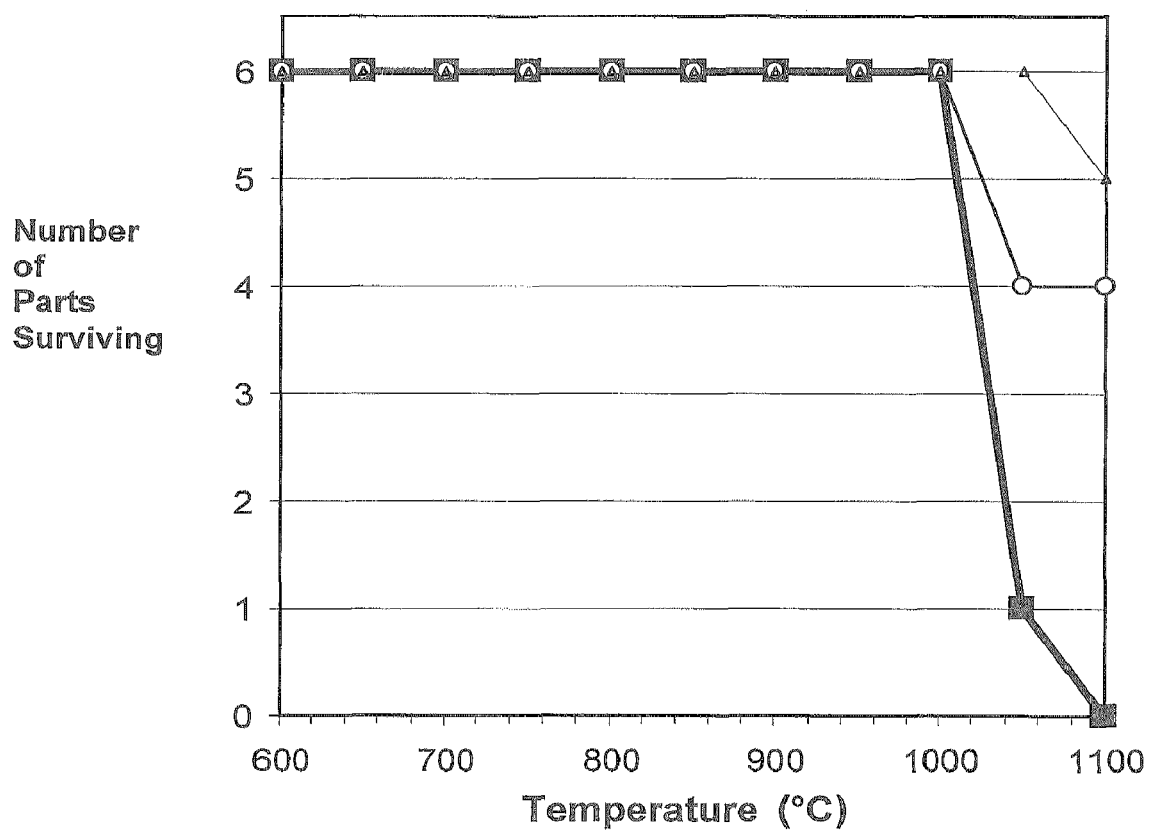
FIG. 7 shows oven thermal shock resistance of bare substrates: Control (C1) (black squares), (B) (circles), and (H) (triangles).

Thermal shock resistance The thermal shock resistance of the disclosed substrate composition (B) has been compared to CONTROL (C1) under thermal downshock conditions (also known as an oven test). In this comparison, substrates measuring approximately 50 mm in diameter by 150 to 180 mm in length were placed directly into a furnace at 600° C. After 30 minutes to reach thermal equilibrium, the parts were pulled from the furnace into circulating ambient temperature air. Once cooled the part was visually and ultrasonically inspected for cracks. Surviving samples were treated twice more at 600° C. after which the temperature of the furnace was raised by 50° C. and the process repeated until all samples had cracked or a temperature of 1100° C. was reached. FIG. 6 shows the excellent thermal shock performance of substrate (B) (open circles) relative to the conventional substrate CONTROL (C1) (black squares). Substrate (B) performance may also be compared to the low microcracked cordierite CONTROL (C2) with reference to FIG. 1.

The disclosure has been described with reference to various specific embodiments and techniques. However, it should be understood that many variations and modifications are possible while remaining within the scope of the disclosure.

TABLE 1

Examples of spodumene-mullite composite batch formulations.

| Inorganic composition in weight percent of pure phase end members | CONTROL C1 | CONTROL C2 | A | B | C | D | E |
|---|---|---|---|---|---|---|---|
| Spodumene (LiAlSi$_2$O$_6$) | 0 | 0 | 44 | 49.8 | 44.3 | 47.863 | 47.863 |
| Cordierite (Mg$_2$Al$_4$Si$_5$O$_{18}$) | 100 | 100 | 20.5 | 0 | 0 | 0 | 0 |
| Silica (SiO$_2$) | 0 | 0 | 35.5 | 40.2 | 35.7 | 38.637 | 38.637 |
| Mullite (Al$_6$Si$_2$O$_{13}$) | 0 | 0 | 0 | 10 | 20 | 13.5 | 13.5 |
| Batch Materials | | | | | | | |
| TT2 - Talc - 96-67 | 40.22 | | | | | | |
| TT8 - Talc - Artic Mist | | 14.35 | | | | | |
| CC2 - Kaolin Hydrous - CHC 94 | | 16 | | 9.882 | 16.000 | 16.000 | 16.000 |
| CC6 - Kaolin, Calcined - EBF-93 | 17.29 | | | | | | |
| CC9 - Kaolin, Hydrous - FHC | 15.22 | | | | | | |
| AA21 - Alumina, Boehmite -Dispal 18N4-80 | 2 | | | | | | |
| AA3 - Alumina, Calcined - A1000 SGD | 4.49 | 26.23 | 4.225 | | | 0.129 | 0.129 |
| AA6 - Alumina, Calcined - HVA-FG | 13.53 | | | | | | |
| Alumina, A3000 | | | | | 3.579 | | |
| QQ1 - Silica - Imsil A25 | 7.25 | 31.42 | 35.345 | 26.384 | 22.982 | 23.146 | 23.146 |
| MM15 - Magnesium Hydroxide - Magshield UF | | 12 | 4.041 | | | | |
| TANCO α-Spodumene, sieved -325 mesh | | | 56.36 | | | | |
| TANCO - Std-Grade, d50 = 4.4, case = 5443 | | | | 63.734 | 57.438 | 60.725 | 60.725 |
| Inorganic superadditions | | | | | | | |
| Cordierite (Seed, 4 micrometers) | | | | 1 | | | |
| Lanthanum oxide | | 1 | | | | | |
| Bentonite CH, Air classified -20 micrometers | | 1 | | | | | |
| Sum | 100.0 | 102.0 | 101.0 | 100.0 | 100.0 | 100.0 | 100.0 |
| Pore Formers + Binders | | | | | | | |
| GG1 - Graphite - 4014, -280 mesh | | 15 | 20 | 20.0 | 20.0 | 20.0 | 0.0 |
| MM3 - Methylcellulose - F240 | 5 | 6 | 6 | 6.0 | 6.0 | 6.0 | 6.0 |
| ZZ7- AKFP rice starch | | 25 | 20 | 20.0 | 20.0 | 20.0 | 0.0 |
| ZZ2 - Cornstarch | | | | | | | |
| Sum | 5 | 46 | 46 | 46.0 | 46.0 | 46.0 | 6.0 |
| Liquids | | | | | | | |
| SS7 - Polyalphaolefin - Durasyn 162 | 4.6 | 4.6 | 4.6 | 4.6 | 4.6 | 4.6 | 4.6 |
| SS8 - Fatty Acid, Tall Oil - Tall Oil L-5 | 0.6 | 0.6 | 0.6 | 0.6 | 0.6 | 0.6 | 0.6 |
| Water | 23 | 32 | 25 | 31.0 | 31.0 | 31.0 | 24.0 |
| Grand Sum | 133.2 | 185.2 | 177.17 | 182.2 | 182.2 | 182.2 | 135.2 |

| Inorganic composition in weight percent of pure phase end members | F | G | H | I | J | K |
|---|---|---|---|---|---|---|
| Spodumene (LiAlSi$_2$O$_6$) | 47.863 | 47.863 | 47.863 | 47.863 | 47.863 | 47.863 |
| Cordierite (Mg$_2$Al$_4$Si$_5$O$_{18}$) | 0 | 0 | 0 | 0 | 0 | 0 |
| Silica (SiO$_2$) | 38.637 | 38.637 | 38.637 | 38.637 | 38.637 | 38.637 |
| Mullite (Al$_6$Si$_2$O$_{13}$) | 13.5 | 13.5 | 13.5 | 13.5 | 13.5 | 13.5 |
| Batch Materials | | | | | | |
| TT2 - Talc - 96-67 | | | | | | |
| TT8 - Talc - Artic Mist | | | | | | |
| CC2 - Kaolin Hydrous - CHC 94 | 16.000 | 16.000 | 16.000 | 16.000 | 16.000 | 16.000 |
| CC6 - Kaolin, Calcined - EBF-93 | | | | | | |
| CC9 - Kaolin, Hydrous - FHC | | | | | | |

TABLE 1-continued

Examples of spodumene-mullite composite batch formulations.

|  |  |  |  |  |  |  |
|---|---|---|---|---|---|---|
| AA21 - Alumina, Boehmite -Dispal 18N4-80 |  |  |  |  |  |  |
| AA3 - Alumina, Calcined - A1000 SGD | 0.129 | 0.129 | 0.129 | 0.129 | 0.129 | 0.129 |
| AA6 - Alumina, Calcined - HVA-FG |  |  |  |  |  |  |
| Alumina, A3 000 |  |  |  |  |  |  |
| QQ1 - Silica - Imsil A25 | 23.146 | 23.146 | 23.146 | 23.146 | 23.146 | 23.146 |
| MM15 - Magnesium Hydroxide - Magshield UF |  |  |  |  |  |  |
| TANCO α-Spodumene, sieved -325 mesh |  |  |  |  |  |  |
| TANCO - Std-Grade, d50 = 4.4, case = 5443 | 60.725 | 60.725 | 60.725 | 60.725 | 60.725 | 60.725 |
| Inorganic superadditions |  |  |  |  |  |  |
| Cordierite (Seed, 4 micrometers) |  |  |  |  |  |  |
| Lanthanum oxide |  |  |  |  |  |  |
| Bentonite CH, Air classified -20 micrometers |  |  |  |  |  |  |
| Sum | 100.0 | 100.0 | 100.0 | 100.0 | 100.0 | 100.0 |
| Pore Formers + Binders |  |  |  |  |  |  |
| GG1 - Graphite - 4014, -280 mesh | 6.0 | 12.0 | 20.0 | 20.0 | 20.0 | 20.0 |
| MM3 - Methylcellulose - F240 | 6.0 | 6.0 | 6.0 | 6.0 | 6.0 | 6.0 |
| ZZ7- AKFP rice starch | 6.0 | 12.0 | 20.0 | 25.0 | 30.0 | 40.0 |
| ZZ2 - Cornstarch |  |  |  |  |  |  |
| Sum | 18.0 | 30.0 | 46.0 | 51.0 | 56.0 | 66.0 |
| Liquids |  |  |  |  |  |  |
| SS7 - Polyalphaolefin - Durasyn 162 | 4.6 | 4.6 | 4.6 | 4.6 | 4.6 | 4.6 |
| SS8 - Fatty Acid, Tall Oil - Tall Oil L-5 | 0.6 | 0.6 | 0.6 | 0.6 | 0.6 | 0.6 |
| Water | 27.0 | 29.0 | 30.0 | 30.0 | 30.0 | 31.0 |
| Grand Sum | 150.2 | 164.2 | 181.2 | 186.2 | 191.2 | 202.2 |

TABLE 2

Sintering temperatures, times, phase assemblages, and physical properties of as-fired spodumene-mullite composites.

| Properties | CONTROL C1 | CONTROL C2 | A | B | B | C | C | D |
|---|---|---|---|---|---|---|---|---|
| Cell density (in$^{-2}$) | 600 | 600 | 200 | 600/3 | 600/3 | 600/3 | 600/3- | 600 |
| Wall thickness (mil) | 3 | 3.94 | 12 | 54047 | 54047 | 54047 | 54047 | 3.8 |
| Sintering - Temperature (° C.) | 1380 | 1360 | 1235 | 1300 | 1275 | 1300 | 1275 | 1285 |
| Time (hr) | 20 | 105 | 20 | 20 | 20 | 20 | 20 | 20 |
| Phase assemblage - Spodumene |  |  | >90 | 95.3 | 88.4 | 86.9 | 80.7 | 91 |
| Cordierite | about 100 | about 100 | <10 |  |  |  |  |  |
| Corundum |  |  |  |  |  |  | 3.7 |  |
| Mullite |  |  |  | 4.7 | 5.5 | 13.1 | 10.3 | 9 |
| Cristobalite |  |  |  |  | 4.5 |  | 3.7 |  |
| Quartz |  |  |  |  | 1.6 |  | 1.5 |  |
| Porosity (%) | 35 | 59.5 | 48.1 | 50.2 | 59.18 | 53.5 | 60.06 | 55 |
| Ware Density (g/cm$^3$) | 0.296 | 0.187 | 0.443 | 0.242 | 0.222 | 0.25 | 0.225 | 0.195 |
| Pore Size (micrometers) - d$_{50}$ | 7.1 | 4.4 | 42.6 | 9.1 | 3.37 | 4.6 | 2.84 | 4.89 |
| Strength (psi) | 345 | 532 | 328 | 454 | 304 | 484 | 294 | 370 |
| Specific Strength (psi · cm$^3$/g) | 1165 | 2844 | 740 | 1874 | 1369 | 1935 | 1307 | 1897 |
| 600/2.5 @ 60% Porosity |  | 427 | 111 | 281 | 205 | 290 | 196 | 285 |
| Microcrack Index (Nb$^3$) | 0.465 | 0.004 | 0.417 | 0.093 | 0.131 | 0.09 | 0.132 | 0.077 |
| Elastic modulus (kpsi) | 641 | 242 | 354 | 359 | 174 | 406 | 192 | 237 |
| CTE (ppm/K) RT-800° C. | 0.32 | 1.48 | 0.06 | 0.5 | 1.41 | 1.22 | 1.92 | 1.06 |
| 1000-200° C. | 0.86 | 1.87 | 1.16 | 0.93 | 1.57 | 1.57 | 2.07 | 1.42 |
| Strain Tolerance (%) | 0.054 | 0.22 | 0.093 | 0.126 | 0.175 | 0.119 | 0.153 | 0.156 |
| Average oven shock failure (° C.) | 1058 | 900 |  |  | >1100 |  |  |  |
| Predicted TSR (° C.)-Heating | >1100 | 1486 | 15443 | 2527 | 1239 | 977 | 798 | 1473 |
| Cooling | 825 | 1376 | 999 | 1559 | 1313 | 959 | 940 | 1299 |

| Properties | D | E | F | G | H | I | J | K |
|---|---|---|---|---|---|---|---|---|
| Cell density (in$^{-2}$) | 600 | 600/3- | 600/3- | 600/3- | 600/3- | 600/3- | 600/3- | 600/3- |
| Wall thickness (mil) | 3.8 | 54047 | 54047 | 54047 | 54047 | 54047 | 54047 | 54047 |
| Sintering - Temperature (° C.) | 1280 | 1285 | 1285 | 1285 | 1285 | 1285 | 1285 | 1285 |
| Time (hr) | 20 | 20 | 20 | 20 | 20 | 20 | 20 | 20 |
| Phase assemblage - | 91.2 | 91 | 91 | 91 | 91 | 91 | 91 | 91 |

TABLE 2-continued

Sintering temperatures, times, phase assemblages, and physical properties of as-fired spodumene-mullite composites.

| | | | | | | | | |
|---|---|---|---|---|---|---|---|---|
| Spodumene | | | | | | | | |
| Cordierite | | | | | | | | |
| Corundum | | | | | | | | |
| Mullite | 8.8 | 9 | 9 | 9 | 9 | 9 | 9 | 9 |
| Cristobalite | | | | | | | | |
| Quartz | | | | | | | | |
| Porosity (%) | 56.8 | 41.9 | 42.2 | 53.9 | 56.7 | 54.4 | 56.4 | 51.7 |
| Ware Density (g/cm$^3$) | 0.186 | 0.32 | 0.30 | 0.25 | 0.24 | 0.23 | 0.23 | 0.24 |
| Pore Size (micrometers) - $d_{50}$ | 4.69 | 6.11 | 7.74 | 4.56 | 3.80 | 4.58 | 4.73 | 5.18 |
| Strength (psi) | | 717 | 649 | 483 | 479 | 448 | 386 | 455 |
| Specific Strength (psi · cm$^3$/g) | | 2220 | 2177 | 1939 | 1979 | 1964 | 1678 | 1921 |
| 600/2.5 @ 60% Porosity | | 333 | 327 | 291 | 297 | 295 | 252 | 288 |
| Microcrack Index (Nb$^3$) | 0.091 | 0.079 | 0.079 | 0.083 | 0.071 | 0.073 | 0.074 | 0.071 |
| Elastic modulus (kpsi) | 189 | 727 | 683 | 329 | 336 | 291 | 301 | 333 |
| CTE (ppm/K) RT-800° C. | 1.27 | 0.90 | 0.85 | 0.92 | 0.97 | 0.96 | 0.95 | 0.91 |
| 1000-200° C. | 1.61 | 1.26 | 1.25 | 1.30 | 1.34 | 1.35 | 1.37 | 1.31 |
| Strain Tolerance (%) | | 0.099 | 0.095 | 0.147 | 0.143 | 0.154 | 0.128 | 0.137 |
| Average oven shock failure (° C.) | | >1100 | 1067 | | >1100 | | | |
| Predicted TSR (° C.)-Heating | | 1096 | 1117 | 1595 | 1469 | 1603 | 1350 | 1502 |
| Cooling | | 983 | 960 | 1329 | 1264 | 1340 | 1136 | 1243 |

TABLE 3

Components and properties of the 3-way catalyst slurry washcoat slurry formulation.

| | |
|---|---|
| $CeO_2$—$ZrO_2$ | Cerium Zirconia |
| Ga-200L | La doped Gamma-Alumina |
| Pt | Dihydrogen Hexachloro Platinate (IV) Solution (Chloroplatinic Acid) |
| Pd | Palladium (II) Nitrate Solution/$Pd(NO_3)_2$ in water |
| Rh | Rhodium (III) Nitrate Solution/$Rh(NO_3)_3$ in solution |
| $H_2O$ | DI Water |
| Al-20 | 20 wt % Colloidal Alumina Suspension |
| Nitric Acid | 60 wt % |
| pH | about 3.82 |
| Solids Content | about 44% |

TABLE 4

Summary of catalytic tests comparing spodumene-mullite (C) to a reference cordierite composition CONTROL (C1).

SV = 60 k/hr, WCL = 0.1 g/cm$^3$

| Material | Ramp (° C./min) | Run | Time to 250° C. (s) Inlet | Outlet | Delay (s) | Time to 50% Conversion (s) CO | NO | $C_3H_6$ |
|---|---|---|---|---|---|---|---|---|
| CONTROL C1 Fresh | 1020 | 349a | 10.17 | 25.50 | 15.33 | 8.77 | 10.49 | 9.23 |
| | | 349b | 9.87 | 25.02 | 15.15 | 7.34 | 9.81 | 8.46 |
| | | 349c | 9.86 | 24.78 | 14.92 | 6.73 | 9.49 | 8.23 |
| | | 349d | 9.95 | 25.03 | 15.08 | 6.66 | 9.40 | 8.25 |
| | | Average | 9.89 | 24.94 | 15.05 | 6.91 | 9.57 | 8.31 |
| CONTROL C1 Fresh | 30 | 350a | 275.61 | 274.27 | -1.34 | 278.56 | 320.52 | 319.27 |
| | | 350b | 275.14 | 275.46 | 0.32 | 279.26 | 314.46 | 313.33 |
| | | 350c | 267.90 | 272.95 | 5.05 | 262.57 | 271.00 | 269.77 |
| | | 350d | 275.21 | 271.29 | -3.92 | 276.14 | 294.24 | 295.49 |
| | | Average | 272.75 | 273.23 | 0.49 | 272.66 | 293.23 | 292.86 |
| CONTROL C1 Aged | 1020 | 358a | 10.93 | 24.76 | 13.84 | 11.82 | 17.42 | 14.21 |
| | | 358b | 10.79 | 24.18 | 13.39 | 13.21 | 20.16 | 16.35 |
| | | 358c | 10.53 | 24.19 | 13.65 | 13.70 | 19.84 | 16.42 |
| | | 358d | 10.74 | 24.16 | 13.42 | 13.71 | 19.88 | 16.96 |
| | | Average | 10.69 | 24.18 | 13.49 | 13.54 | 19.96 | 16.58 |
| CONTROL C1 Aged | 30 | 359a | 270.40 | 273.84 | 3.44 | 350.60 | 450.05 | 398.34 |
| | | 359b | 278.05 | 272.11 | -5.94 | 347.03 | 448.54 | 400.92 |
| | | 359c | 275.71 | 271.47 | -4.25 | 353.82 | 449.18 | 404.44 |
| | | 359d | 278.25 | 270.59 | -7.66 | 358.65 | 449.71 | 405.83 |
| | | Average | 277.34 | 271.39 | -5.95 | 353.17 | 449.14 | 403.73 |
| C Fresh | 1020 | 428a | 13.35 | 34.15 | 20.80 | 10.98 | 14.43 | 11.56 |
| | | 428b | 12.98 | 33.21 | 20.23 | 8.48 | 13.38 | 10.87 |
| | | 428c | 12.77 | 33.16 | 20.40 | 7.97 | 12.72 | 10.26 |
| | | 428d | 13.03 | 33.08 | 20.05 | 7.92 | 12.74 | 10.44 |
| | | Average | 12.92 | 33.15 | 20.23 | 8.13 | 12.95 | 10.52 |

TABLE 4-continued

Summary of catalytic tests comparing spodumene-mullite
(C) to a reference cordierite composition CONTROL (C1).

SV = 60 k/hr, WCL = 0.1 g/cm³

| Material | Ramp (° C./min) | Run | Time to 250° C. (s) Inlet | Outlet | Delay (s) | Time to 50% Conversion (s) CO | NO | $C_3H_6$ |
|---|---|---|---|---|---|---|---|---|
| C Fresh | 30 | 429a | 274.84 | 318.48 | 43.63 | 259.80 | 316.94 | 313.38 |
| | | 429b | 277.53 | 313.73 | 36.20 | 251.10 | 305.68 | 307.52 |
| | | 429c | 275.54 | 311.24 | 35.71 | 250.11 | 299.15 | 305.26 |
| | | 429d | 275.90 | 310.39 | 34.50 | 246.04 | 295.08 | 303.52 |
| | | Average | 276.32 | 311.79 | 35.47 | 249.08 | 299.97 | 305.43 |
| C Aged | 1020 | 430a | 13.58 | 33.69 | 20.11 | 11.01 | 15.62 | 12.74 |
| | | 430b | 13.87 | 33.10 | 19.23 | 10.08 | 19.46 | 15.24 |
| | | 430c | 13.56 | 33.67 | 20.11 | 11.06 | 21.05 | 16.80 |
| | | 430d | 13.87 | 33.79 | 19.92 | 11.42 | 21.37 | 17.12 |
| | | Average | 13.77 | 33.52 | 19.75 | 10.85 | 20.63 | 16.39 |
| C Aged | 30 | 431a | 278.54 | 320.75 | 42.21 | 317.55 | 487.46 | 403.70 |
| | | 431b | 275.49 | 314.92 | 39.43 | 324.78 | 288.18 | 403.70 |
| | | 431c | 275.66 | 326.23 | 50.57 | 324.12 | 504.06 | 407.99 |
| | | 431d | 278.21 | 326.15 | 47.94 | 340.68 | 512.66 | 410.95 |
| | | Average | 276.45 | 322.43 | 45.98 | 329.86 | 434.97 | 407.55 |

TABLE 5

Properties of a selected coated low microcracked cordierite CONTROL
(C2), and two coated spodumene-mullite composites (B & C).

| | Condition | MOR (psi) | Emod (kpsi) | ST (%) | CTE (ppm/° C.) Heating RT-800 | Cooling 1000-200 | Predicted TSP (° C.) Heating RT-800 | Cooling 1000-200 |
|---|---|---|---|---|---|---|---|---|
| CONTROL C2 | As fired-Bare | 433 | 721 | 0.060% | 0.47 | 1.03 | 1278 | 782 |
| | Washcoated | 482 | 886 | 0.054% | 0.84 | 1.34 | 648 | 606 |
| | Washcoated-Aged | 448 | 724 | 0.062% | 0.52 | 1.20 | 1190 | 716 |
| CONTROL C2 | As-fired Bare | 358 | 237 | 0.151% | 1.36 | 1.85 | 1110 | 1018 |
| | Wash coated | 327 | 264 | 0.124% | 1.34 | 1.92 | 924 | 846 |
| | Wash coated-Aged | 183 | 238 | 0.077% | 1.20 | 1.70 | 641 | 652 |
| B (sintered @ 1275° C.) | As fired-Bare | 304 | 174 | 0.175% | 1.41 | 1.57 | 1239 | 1313 |
| | Wash coated | 434 | 288 | 0.151% | 1.42 | 1.60 | 1060 | 1144 |
| | Wash coated-Aged | 383 | 286 | 0.134% | 0.84 | 1.20 | 1593 | 1312 |
| C (sintered @ 1275° C.) | As fired-Bare | 294 | 192 | 0.153% | 1.92 | 2.07 | 798 | 940 |
| | Wash coated | 384 | 316 | 0.121% | 1.86 | 2.07 | 653 | 788 |
| | Wash coated-Aged | 345 | 275 | 0.125% | 1.90 | 2.14 | 660 | 786 |

What is claimed is:

1. A porous ceramic body comprised of a major phase of beta-spodumene and a minor phase of mullite, wherein the body comprises weight percents of spodumene $LiAlSi_2O_6$, silica $SiO_2$, and mullite $Al_6Si_2O_{13}$ according to:

$$w_{spodumene}=100x(0.2z+0.75),$$

$$w_{silica}=100(1-x)(0.2z+0.75), \text{ and}$$

$$w_{mullite}=100(0.25-0.2z)$$

where x is a unitless parameter of from about 0.55 to about 0.75 and z is a unitless parameter of from about 0 to about 1.

2. The body of claim 1 wherein the beta-spodumene and mullite phases together comprise more than 90% by weight of the body, and the body contains less than 5% by weight of an amorphous phase.

3. The body of claim 1 wherein the body comprises greater than 50% beta-spodumene and less than 40% mullite by weight.

4. The body of claim 1 wherein the body comprises greater than 75% beta-spodumene and less than 25% mullite by weight.

5. The body of claim 1 wherein the body further comprises less than 15% corundum by weight.

6. The body of claim 1 wherein the body has a total porosity of greater than 35% as measured by mercury intrusion porosimetry.

7. The body of claim 1 wherein the body has a total porosity of 35 to 70% as measured by mercury intrusion porosimetry.

8. The body of claim 1 wherein the body has a median pore size of from about 2 to about 20 micrometers.

9. The body of claim 1 wherein the body has a pore size distribution $(d_{90}-d_{10})/d_{50}$ less than 0.4.

10. A combustion engine exhaust emissions control device comprising a honeycomb of the porous ceramic body of claim 1 having a honeycomb volumetric density of less than 0.3 g/cm³.

11. The device of claim 10 wherein the device is selected from the group consisting of close-coupled engine exhaust converters, gasoline engine particulate exhaust filters, and NOx integrated engine exhaust filters.

12. A porous spodumene-mullite honeycomb body having a honeycomb volumetric density of less than 0.3 g/cm$^3$.

13. The honeycomb body of claim 12 having an axial modulus of rupture strength of from about 175 to about 1200 psi.

14. The honeycomb body according to claim 12 having a microcrack index $Nb^3$ below 0.2.

* * * * *